(12) United States Patent
Kang (10) Patent No.: US 8,055,092 B2
(45) Date of Patent: Nov. 8, 2011

(54) IMAGE PROCESSING APPARATUS AND IMAGE PROCESSING METHOD

(75) Inventor: Bong-Su Kang, Seoul (KR)

(73) Assignee: Core Logic, Inc., Seoul (KR)

( * ) Notice: Subject to any disclaimer, the term of this patent is extended or adjusted under 35 U.S.C. 154(b) by 782 days.

(21) Appl. No.: 12/154,640

(22) Filed: May 23, 2008

(65) Prior Publication Data
US 2008/0292207 A1  Nov. 27, 2008

(30) Foreign Application Priority Data

May 25, 2007  (KR) .................. 10-2007-0050790

(51) Int. Cl.
*G06K 9/40* (2006.01)
(52) U.S. Cl. ........................................ 382/274
(58) Field of Classification Search ........... 382/254–275
See application file for complete search history.

(56) References Cited

U.S. PATENT DOCUMENTS

| | | | |
|---|---|---|---|
| 5,600,370 A * | 2/1997 | Furuyama | 348/239 |
| 6,636,646 B1 * | 10/2003 | Gindele | 382/274 |
| 2001/0007599 A1 * | 7/2001 | Iguchi et al. | 382/274 |
| 2003/0174216 A1 * | 9/2003 | Iguchi et al. | 348/223.1 |
| 2003/0174886 A1 * | 9/2003 | Iguchi et al. | 382/167 |
| 2003/0206664 A1 * | 11/2003 | Gomila et al. | 382/268 |
| 2007/0036405 A1 * | 2/2007 | Lienard et al. | 382/128 |
| 2007/0046829 A1 * | 3/2007 | Su et al. | 348/678 |
| 2007/0248282 A1 * | 10/2007 | Suzuki | 382/282 |

\* cited by examiner

*Primary Examiner* — Jingge Wu
(74) *Attorney, Agent, or Firm* — Edwards Angell Palmer & Dodge LLP; Kongsik Kim (57) ABSTRACT

An image processing apparatus is provided, including a brightness change level classifying unit, a dynamic weight calculating unit, and a brightness correcting unit. The brightness change level classifying unit compares a brightness change average value representing brightness changes from a pixel of interest to neighboring pixels around the pixel of interest with an upper threshold value and a lower threshold value and classifies the brightness change level of the pixel of interest into three types of levels according to the result of the comparison. An upper threshold value and a lower threshold value are predetermined based on the brightness of the pixel of interest. The dynamic weight calculating unit calculates different dynamic weights according to the brightness change level of the pixel of interest. The brightness correcting unit corrects the brightness of the pixel of interest, based on the dynamic weights. Accordingly, noise generated on a plane part of an image is minimized and a contour of the image is appropriately emphasized, consequently improving the definition of images.

20 Claims, 11 Drawing Sheets

|     |     |     |     |     |
|-----|-----|-----|-----|-----|
| y11 | y12 | y13 | y14 | y15 |
| y21 | y22 | y23 | y24 | y25 |
| y31 | y32 | y33 | y34 | y35 |
| y41 | y42 | y43 | y44 | y45 |
| y51 | y52 | y53 | y54 | y55 |

PUU1, PVV, PWW1

$$VV = \frac{1}{16} \begin{bmatrix} 1 & 1 & 1 \\ 1 & 8 & 1 \\ 1 & 1 & 1 \end{bmatrix} \begin{bmatrix} y22 & y23 & y24 \\ y32 & y33 & y34 \\ y42 & y43 & y44 \end{bmatrix}$$

$$UU1 = \frac{1}{16} \begin{bmatrix} 1 & 1 & 1 \\ 1 & 8 & 1 \\ 1 & 1 & 1 \end{bmatrix} \begin{bmatrix} y21 & y22 & y23 \\ y31 & y32 & y33 \\ y41 & y42 & y43 \end{bmatrix}$$

$$WW1 = \frac{1}{16} \begin{bmatrix} 1 & 1 & 1 \\ 1 & 8 & 1 \\ 1 & 1 & 1 \end{bmatrix} \begin{bmatrix} y23 & y24 & y25 \\ y33 & y34 & y35 \\ y43 & y44 & y45 \end{bmatrix}$$

$$H1 = \frac{|VV - UU1|}{VV} \qquad H2 = \frac{|VV - WW1|}{VV}$$

FIG. 4

$$VV = \frac{1}{16}$$

$$UU2 = \frac{1}{16}$$

$$WW2 = \frac{1}{16}$$

$$V1 = \frac{|VV - UU2|}{VV} \qquad V2 = \frac{|VV - WW2|}{VV}$$

FIG. 5

| y11 | y12 | y13 | y14 | y15 |
|---|---|---|---|---|
| y21 | y22 | y23 | y24 | y25 |
| y31 | y32 | y33 | y34 | y35 |
| y41 | y42 | y43 | y44 | y45 |
| y51 | y52 | y53 | y54 | y55 |

PUU3, PVV, PWW3

$$VV = \frac{1}{16} \begin{bmatrix} 1 & 1 & 1 \\ 1 & 8 & 1 \\ 1 & 1 & 1 \end{bmatrix} \begin{bmatrix} y22 & y23 & y24 \\ y32 & y33 & y34 \\ y42 & y43 & y44 \end{bmatrix}$$

$$UU3 = \frac{1}{16} \begin{bmatrix} 1 & 1 & 1 \\ 1 & 8 & 1 \\ 1 & 1 & 1 \end{bmatrix} \begin{bmatrix} y13 & y14 & y15 \\ y23 & y24 & y25 \\ y33 & y34 & y35 \end{bmatrix}$$

$$WW3 = \frac{1}{16} \begin{bmatrix} 1 & 1 & 1 \\ 1 & 8 & 1 \\ 1 & 1 & 1 \end{bmatrix} \begin{bmatrix} y31 & y32 & y33 \\ y41 & y42 & y43 \\ y51 & y52 & y53 \end{bmatrix}$$

$$S1 = \frac{|VV - UU3|}{VV} \qquad S2 = \frac{|VV - WW3|}{VV}$$

FIG. 6

[Grid 5x5 with cells y11–y55, showing regions PUU4, PVV, PWW4]

$$VV = \frac{1}{16} \begin{array}{|c|c|c|} \hline 1 & 1 & 1 \\ \hline 1 & 8 & 1 \\ \hline 1 & 1 & 1 \\ \hline \end{array} \quad \begin{array}{|c|c|c|} \hline y22 & y23 & y24 \\ \hline y32 & y33 & y34 \\ \hline y42 & y43 & y44 \\ \hline \end{array}$$

$$UU4 = \frac{1}{16} \begin{array}{|c|c|c|} \hline 1 & 1 & 1 \\ \hline 1 & 8 & 1 \\ \hline 1 & 1 & 1 \\ \hline \end{array} \quad \begin{array}{|c|c|c|} \hline y11 & y12 & y13 \\ \hline y21 & y22 & y23 \\ \hline y31 & y32 & y33 \\ \hline \end{array}$$

$$WW4 = \frac{1}{16} \begin{array}{|c|c|c|} \hline 1 & 1 & 1 \\ \hline 1 & 8 & 1 \\ \hline 1 & 1 & 1 \\ \hline \end{array} \quad \begin{array}{|c|c|c|} \hline y33 & y34 & y35 \\ \hline y43 & y44 & y45 \\ \hline y53 & y54 & y55 \\ \hline \end{array}$$

$$B1 = \frac{|VV - UU4|}{VV} \qquad B2 = \frac{|VV - WW4|}{VV}$$

IMAGE PROCESSING APPARATUS AND IMAGE PROCESSING METHOD

CROSS-REFERENCE TO RELATED PATENT APPLICATION

This application claims the benefit of Korean Patent Application No. 10-2007-0050790, filed on May 25, 2007, in the Korean Intellectual Property Office, the disclosure of which is incorporated herein in its entirety by reference.

BACKGROUND OF THE INVENTION

1. Field of the Invention

The present invention relates to an image processing apparatus and an image processing method, and more particularly, to an image processing apparatus and an image processing method by which noise on a plane part of an image is reduced and at the same time the contour of an edge part of the image is emphasized.

2. Description of the Related Art

In some cases, the boundary of an object included in an image output from a general image processing apparatus such as a digital camera built into a mobile phone, that is, the contour of the image, may be blurred. An image contour denotes a boundary in which the location, shape, size, etc. of an object is changed. Such an image contour has a lot of information about the image and exists at a point where the brightness of the image changes from a low value to a high value or vice versa.

The image contour has been emphasized using a sharpening filter that is suitable for image signals. However, the use of a sharpening filter causes noise generated on a plane part of an image to be reinforced.

SUMMARY OF THE INVENTION

The present invention provides an image processing apparatus and an image processing method by which noise generated on a plane part of an image is minimized and the contour of the image is appropriately emphasized, consequently improving the definition of images.

The present invention also provides an image processing apparatus and an image processing method by which detailed information included in an image is inspected and the image is then processed considering the detailed information, consequently efficiently improving the quality of output images.

According to an aspect of the present invention, there is provided an image processing apparatus comprising: a brightness change level classifying unit comparing a brightness change average value representing brightness changes from a pixel of interest to neighboring pixels around the pixel of interest with an upper threshold value and a lower threshold value and classifying a brightness change level of the pixel of interest into three types of levels according to a result of the comparison, wherein the upper threshold value and the lower threshold value are predetermined based on a brightness of the pixel of interest; a dynamic weight calculating unit calculating different dynamic weights according to the brightness change level of the pixel of interest; and a brightness correcting unit correcting the brightness of the pixel of interest, based on the dynamic weights.

The brightness change level classifying unit may comprise: a brightness variation calculating unit for calculating 8 brightness variations of 8 3×3 pixel areas surrounding, in 8 directions, a central 3×3 pixel area that includes a pixel of interest as a center pixel, wherein all the 3×3 pixel areas are within a 5×5 pixel area; and a comparing/classifying unit for comparing a brightness change average value corresponding to a mean of the 8 brightness variations with the lower threshold value and the upper threshold value, and classifying a brightness change level of the pixel of interest into three types of levels.

Predetermined weights may be applied to center pixels of the 8 3×3 pixel areas and the central 3×3 pixel area.

When the brightness change average value is less than or equal to the lower threshold value, the comparing/classifying unit may classify the brightness change level of the pixel of interest into a first level. When the brightness change average value is more than the lower threshold value and less than the upper threshold value, the comparing/classifying unit may classify the brightness change level of the pixel of interest into a second level. When the brightness change average value is equal to or more than the upper threshold value, the comparing/classifying unit may classify the brightness change level of the pixel of interest into a third level. The upper and lower threshold values may be obtained by multiplying two different proportionality constants by an average brightness of the central 3×3 pixel area.

The dynamic weight calculating unit may comprise: a first weight calculating unit calculating a first weight, based on the brightness change level of the pixel of interest; and a second weight adding unit adding a second weight to the first weight, based on the brightness of the pixel of interest.

When the brightness change level of the pixel of interest is classified into the first level, the first weight calculating unit may calculate a low-level first weight. When the brightness change level of the pixel of interest is classified into the third level, the first weight calculating unit may calculate a high-level first weight. When the brightness change level of the pixel of interest is classified into the second level, the first weight calculating unit may calculate an intermediate-level first weight that gradually increases from the low-level first weight to the high-level first weight.

The intermediate-level first weight may linearly increase from the low-level first weight to the high-level first weight.

When the brightness of the pixel of interest is more than 20% and less than 80% of a maximum gray scale, the second weight adding unit may add a second weight having a value of 1 to the first weight. When the brightness of the pixel of interest is less than or equal to 20% of the maximum gray scale, the second weight adding unit may add a second weight which is proportional to the brightness of the pixel of interest and has a value of 1 or less, to the first weight. When the brightness of the pixel of interest is equal to or more than 80% of the maximum gray scale, the second weight adding unit may add a second weight which is inversely proportional to the brightness of the pixel of interest and has a value of 1 or less, to the first weight.

The brightness correcting unit may comprise: a brightness difference calculating unit for calculating a brightness difference by subtracting an average brightness from the brightness of the pixel of interest, wherein the average brightness is obtained by applying, to the 5×5 pixel area, a mask having weights increasing toward the center of the 5×5 pixel area; and a corrected brightness calculating unit for calculating a corrected brightness adding the average brightness to a value obtained by multiplying the brightness difference from the brightness difference calculating unit and the dynamic weight from the dynamic weight calculating unit.

According to another aspect of the present invention, there is provided an image processing method comprising: a brightness change level classifying operation of comparing a brightness change average value representing brightness changes from a pixel of interest to neighboring pixels around the pixel of interest with an upper threshold value and a lower threshold value and classifying the brightness change level of the pixel of interest into three types of levels according to a result of the comparison, wherein the upper threshold value and the lower threshold value are predetermined based on a brightness of the pixel of interest; a dynamic weight calculating operation of calculating different dynamic weights according to the brightness change level of the pixel of interest; and a brightness correcting operation of correcting the brightness of the pixel of interest, based on the dynamic weights.

The brightness change level classifying operation may comprise: a brightness variation calculating sub-operation of calculating 8 brightness variations of 8 3×3 pixel areas surrounding, in 8 directions, a central 3×3 pixel area that includes a pixel of interest as a center pixel, wherein all the 3×3 pixel areas are within a 5×5 pixel area; and a comparing/classifying operation that include (1) comparing a brightness change average value corresponding to a mean of the 8 brightness variations with the lower threshold value and the upper threshold value, and (2) classifying a brightness change level of the pixel of interest into three types of levels.

Predetermined weights may be applied to center pixels of the 8 3×3 pixel areas and the central 3×3 pixel area.

In the comparing/classifying operation, when the brightness change average value is less than or equal to the lower threshold value, the brightness change level of the pixel of interest may be classified into a first level; when the brightness change average value is more than the lower threshold value and less than the upper threshold value, the brightness change level of the pixel of interest may be classified into a second level; and when the brightness change average value is equal to or more than the upper threshold value, the brightness change level of the pixel of interest may be classified into a third level.

The dynamic weight calculating operation may comprise: a first weight calculating sub-operation of calculating a first weight, based on the brightness change level of the pixel of interest; and a second weight adding sub-operation of adding a second weight to the first weight, based on the brightness of the pixel of interest.

In the first weight calculating sub-operation, when the brightness change level of the pixel of interest is classified into the first level, a low-level first weight may be calculated; when the brightness change level of the pixel of interest is classified into the third level, a high-level first weight may be calculated; and when the brightness change level of the pixel of interest is classified into the second level, an intermediate-level first weight that gradually increases from the low-level first weight to the high-level first weight may be calculated.

The intermediate-level first weight may linearly increase from the low-level first weight to the high-level first weight.

In the second weight adding sub-operation, when the brightness of the pixel of interest is more than 20% and less than 80% of a maximum gray scale, a second weight having a value of 1 may be added to the first weight; when the brightness of the pixel of interest is less than or equal to 20% of the maximum gray scale, a second weight which is proportional to the brightness of the pixel of interest and has a value of 1 or less, may be added to the first weight; and when the brightness of the pixel of interest is equal to or more than 80% of the maximum gray scale, a second weight which is inversely proportional to the brightness of the pixel of interest and has a value of 1 or less, may be added to the first weight.

The brightness correcting operation may comprise: a brightness difference calculating sub-operation of calculating a brightness difference by subtracting an average brightness from the brightness of the pixel of interest, wherein the average brightness is obtained by applying, to the 5×5 pixel area, a mask having weights increasing toward the center of the 5×5 pixel area; and a corrected brightness calculating sub-operation of calculating a corrected brightness by adding the average brightness to a value obtained by multiplying the brightness difference from the brightness difference calculating sub-operation and the dynamic weight from the dynamic weight calculating operation.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
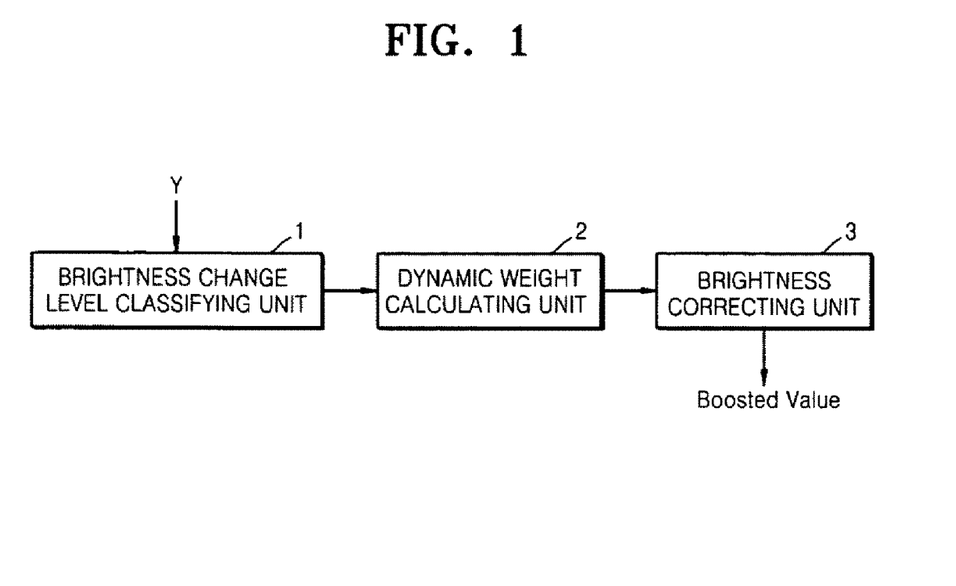
FIG. 1 is a block diagram of an image processing apparatus according to an embodiment of the present invention.

FIG. 1 is a block diagram of an image processing apparatus according to an embodiment of the present invention. Referring to FIG. 1, the image processing apparatus according to the current embodiment includes a brightness change level classifying unit 1, a dynamic weight calculating unit 2, and a brightness correcting unit 3.

The brightness change level classifying unit 1 compares a brightness change average value representing brightness changes from a pixel of interest to neighboring pixels around the pixel of interest with an upper threshold value and a lower threshold value that are predetermined based on the brightness of the pixel of interest and classifies the brightness change level of the pixel of interest into three types of levels according to the result of the comparison.

Figure 2:
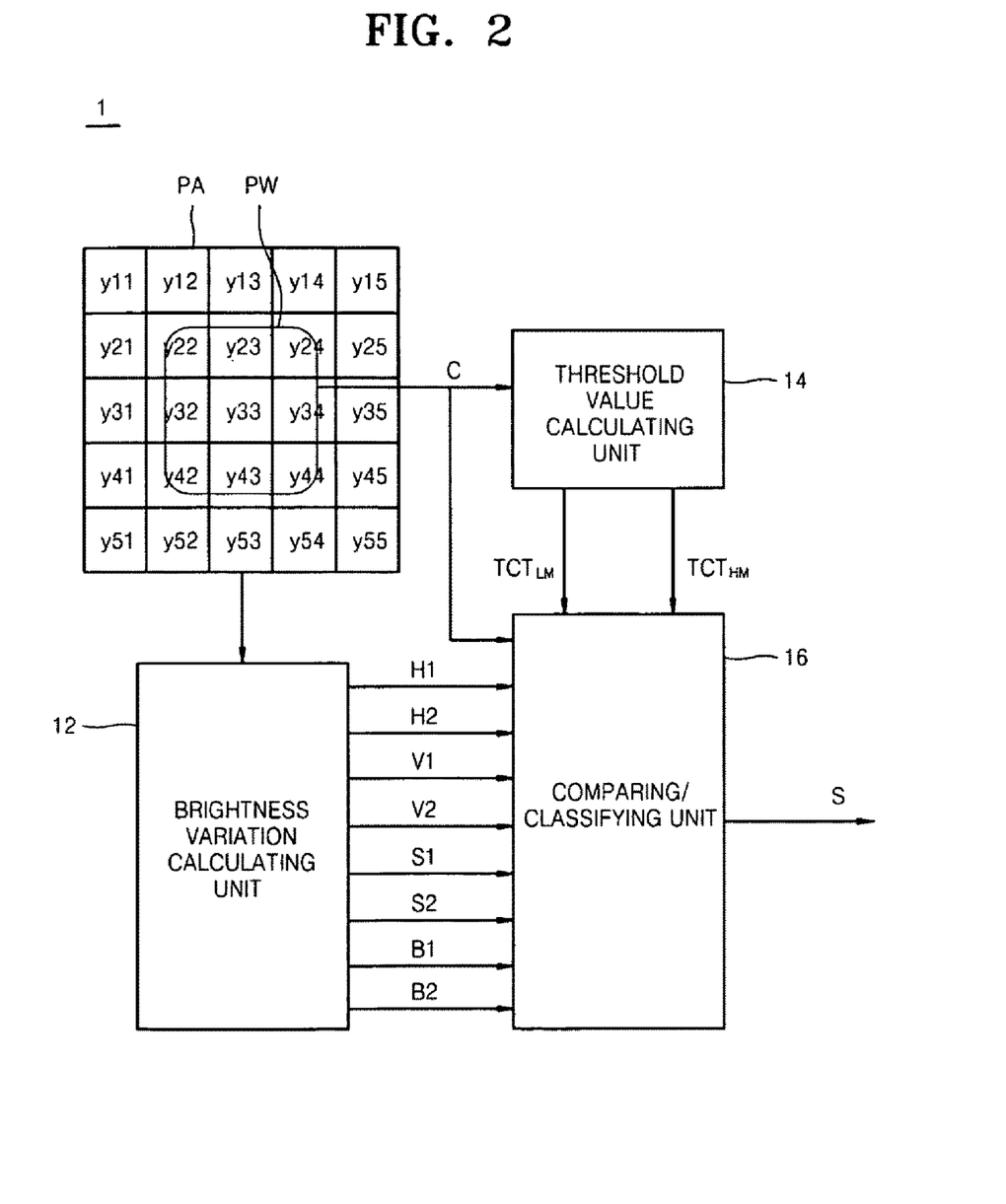
FIG. 2 is a block diagram of a brightness change level classifying unit illustrated in FIG. 1.

The brightness change level classifying unit 1 may be configured as illustrated in FIG. 2.

FIG. 2 is a block diagram of the brightness change level classifying unit 1 of FIG. 1. Referring to FIG. 2, the brightness change level classifying unit 1 includes a brightness variation calculating unit 12, a threshold value calculating unit 14, and a comparing/classifying unit 16.

The brightness variation calculating unit 12 calculates 8 brightness variations H1, H2, V1, V2, S1, S2, B1, and B2 of 8 3×3 pixel areas, whose centers are respectively pixels y22, y23, y24, y32, y34, y42, y43, and y44, existing in 8 directions from a central 3×3 pixel area PVV including a pixel of interest y33 within a 5×5 pixel area PA.

The operation of the brightness variation calculating unit 12 will now be described in greater detail with reference to FIGS. 3 through 6.

FIGS. 3 through 6 illustrate a method of calculating brightness variations of the 8 3×3 pixel areas existing in 8 directions within the 5×5 pixel area PA including the pixel of interest y33.

Figure 3:
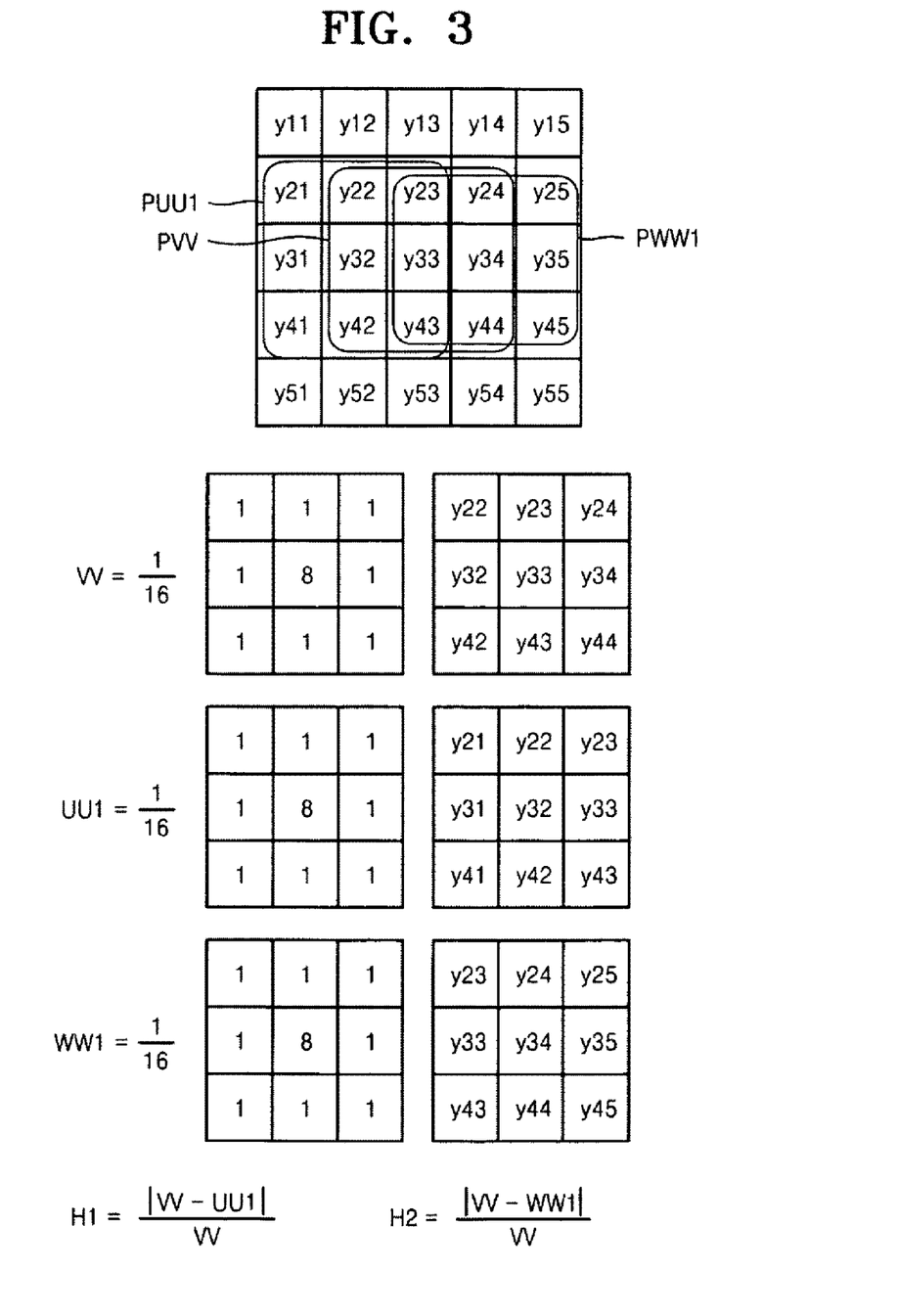
FIGS. 3 through 6 illustrate a method of calculating brightness variations of a 5×5 pixel area including a pixel of interest in 8 directions.

Referring to FIG. 3, the brightness variation H1 of a left 3×3 pixel area PUU1 existing on a left side of the central 3×3 pixel area PVV including the pixel of interest y33 and the brightness variation H2 of a right 3×3 pixel area PWW1 existing on a right side of the central 3×3 pixel area PVV are calculated using Equations 1 and 2:

$$H1 = \frac{|VV - UU1|}{VV} \quad (1)$$

wherein H1 indicates the brightness variation of the left 3×3 pixel area PUU1 on the left side of the central 3×3 pixel area PVV including the pixel of interest y33, VV indicates an average brightness of the central 3×3 pixel area PVV including the pixel of interest y33, and UU1 indicates an average brightness of the left 3×3 pixel area PUU1. An average brightness of each 3×3 pixel area is calculated after a predetermined weight is applied to the center pixel of each 3×3 pixel area. For example, upon calculation of VV as illustrated in FIG. 3, a weight applied to the center pixel y33 of the central 3×3 pixel area PVV may be 8 times as large as those applied to neighboring pixels y22, y23, y24, y32, y34, y42, y43, and y44 around the center pixel y33. However, the value of the weight applied to the center pixel y33 is not limited to the value which is 8 times as large as the values applied to the neighboring pixels. The weights which are applied to the center pixels of the 3×3 pixel areas during calculations of the average brightness values of the 3×3 pixel areas may be equal to the value of the weight applied to the center pixel y33 of the central 3×3 pixel area PVV and used in Equations 2 through 8.

Equation 2 is:

$$H2 = \frac{|VV - WW1|}{VV} \quad (2)$$

wherein H2 indicates the brightness variation of the right 3×3 pixel area PWW1 on the right side of the central 3×3 pixel area PVV, VV indicates the average brightness of the central 3×3 pixel area PVV, and WW1 indicates an average brightness of the right 3×3 pixel area PWW1.

Figure 4:
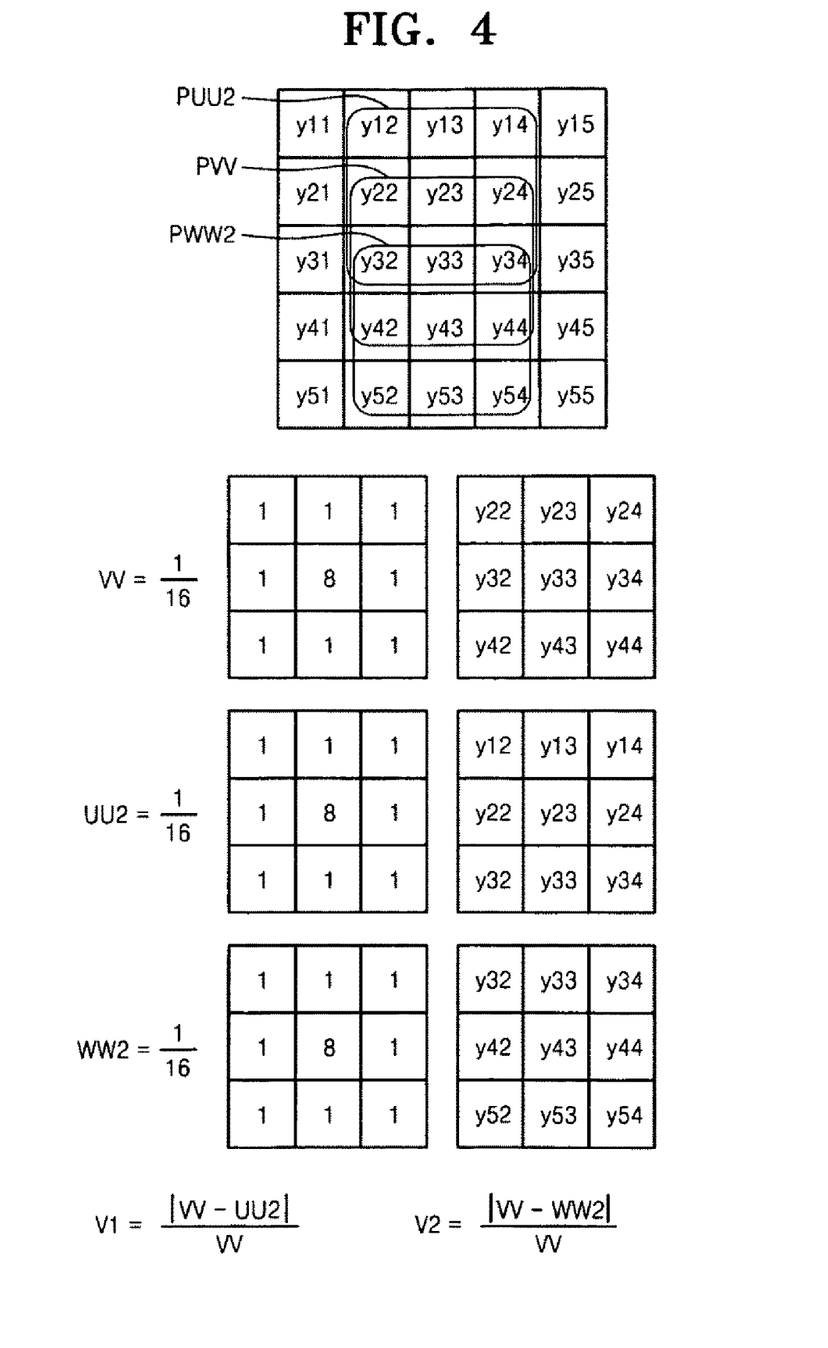

Referring to FIG. 4, the brightness variation V1 of an upper 3×3 pixel area PUU2 existing on an upper side of the central 3×3 pixel area PVV and the brightness variation V2 of a lower 3×3 pixel area PWW2 existing on a lower side of the central 3×3 pixel area PVV are calculated using Equations 3 and 4:

$$V1 = \frac{|VV - UU2|}{VV} \quad (3)$$

$$V2 = \frac{|VV - WW2|}{VV} \quad (4)$$

wherein V1 indicates the brightness variation of the upper 3×3 pixel area PUU2 on the upper side of the central 3×3 pixel area PVV, VV indicates the average brightness of the 3×3 pixel area PVV, UU2 indicates an average brightness of the upper 3×3 pixel area PUU2. V2 indicates the brightness variation of the lower 3×3 pixel area PWW2 on the lower side of the central 3×3 pixel area PVV, and WW2 indicates an average brightness of the lower 3×3 pixel area PWW2.

Figure 5:
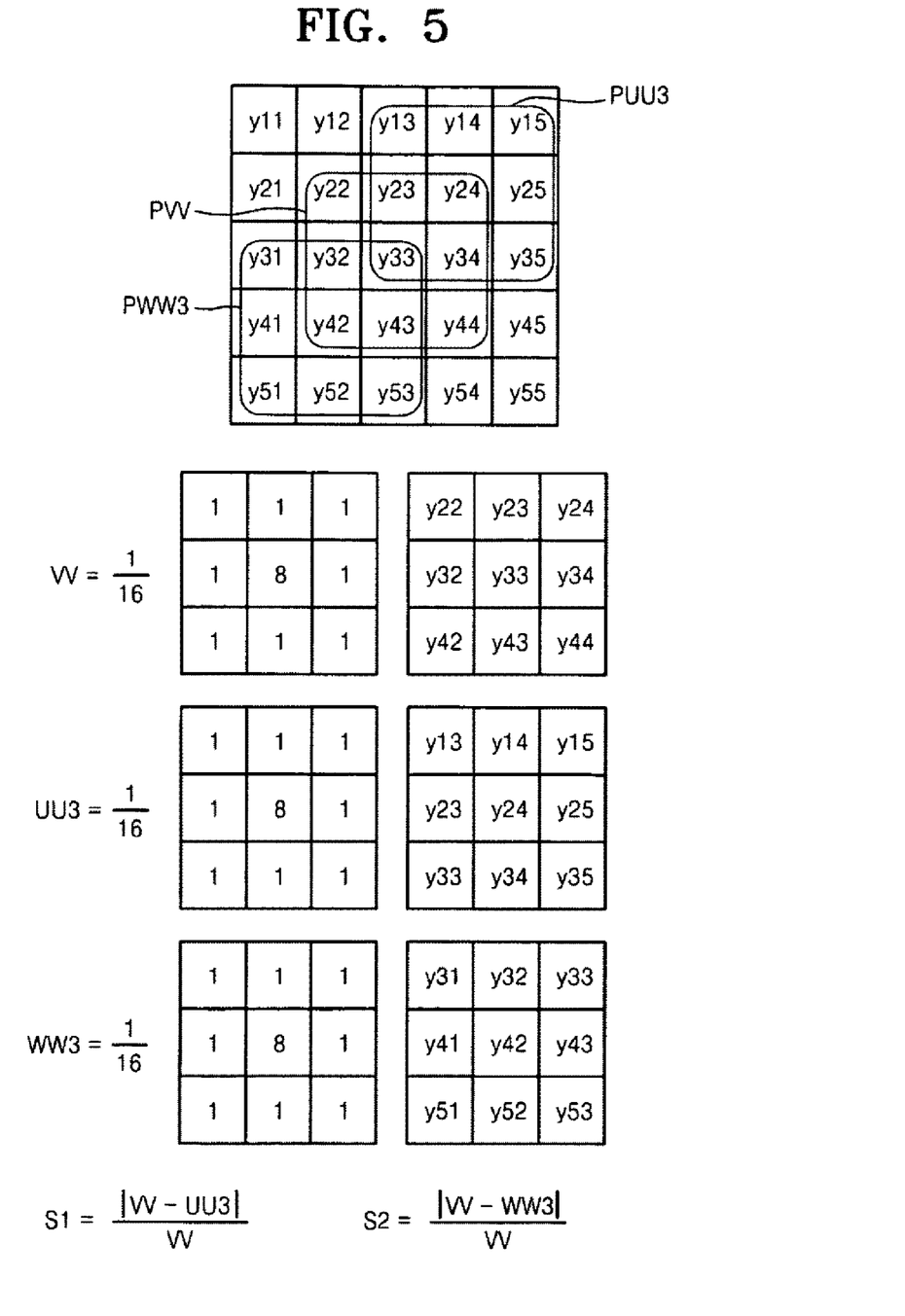

Referring to FIG. 5, the brightness variation S1 of a right upper 3×3 pixel area PUU3 existing on a right upper side of the central 3×3 pixel area PVV including and the brightness variation S2 of a left lower 3×3 pixel area PWW3 existing on a left lower side of the central 3×3 pixel area PVV are calculated using Equations 5 and 6:

$$S1 = \frac{|VV - UU3|}{VV} \quad (5)$$

$$S2 = \frac{|VV - WW3|}{VV} \quad (6)$$

wherein S1 indicates the brightness variation of the right upper 3×3 pixel area PUU3 on the right upper side of the central 3×3 pixel area PVV, VV indicates the average brightness of the central 3×3 pixel area PVV, UU3 indicates an average brightness of the right upper 3×3 pixel area PUU3. S2 indicates the brightness variation of the left lower 3×3 pixel area PWW3 on the left lower side of the central 3×3 pixel area PVV, and WW3 indicates an average brightness of the left lower 3×3 pixel area PWW3.

Figure 6:
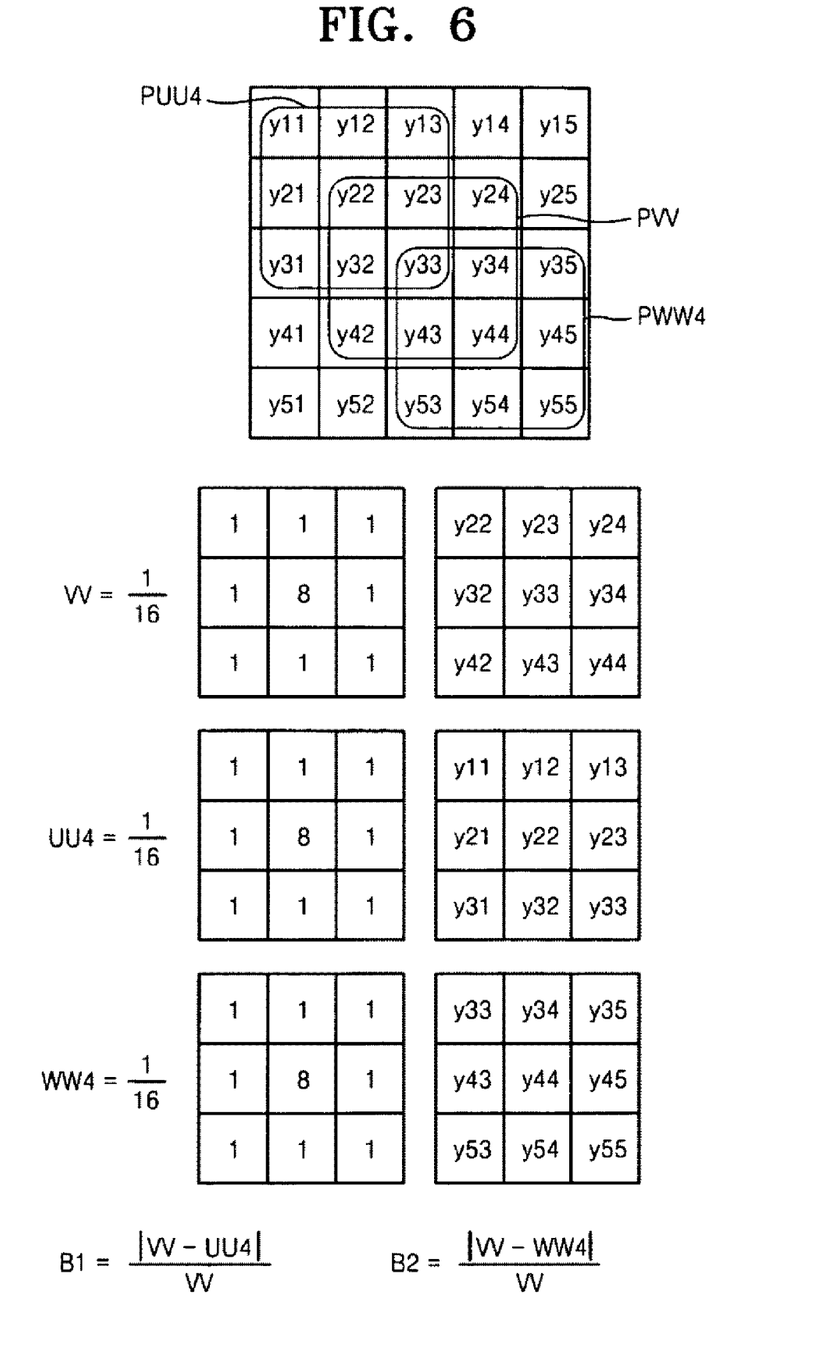

Referring to FIG. 6, the brightness variation B1 of a left upper 3×3 pixel area PUU4 existing on a left upper side of the central 3×3 pixel area PVV and the brightness variation B2 of a right lower 3×3 pixel area PWW4 existing on a right lower side of the central 3×3 pixel area PVV are calculated using Equations 7 and 8:

$$B1 = \frac{|VV - UU4|}{VV} \quad (7)$$

$$B2 = \frac{|VV - WW4|}{VV} \quad (8)$$

wherein B1 indicates the brightness variation of the left upper 3×3 pixel area PUU4 on the left upper side of the central 3×3 pixel area PVV, VV indicates the average brightness of the central 3×3 pixel area PVV, UU4 indicates an average brightness of the left upper 3×3 pixel area PUU4. B2 indicates the brightness variation of the right lower 3×3 pixel area PWW4 on the right lower side of the central 3×3 pixel area PVV, and WW4 indicates an average brightness of the right lower 3×3 pixel area PWW4.

The threshold value calculating unit 14 calculates a lower threshold value $TCT_{LM}$ and an upper threshold value $TCT_{HM}$, based on the average brightness C of the central 3×3 pixel area PVV. More specifically, the threshold value calculating unit 14 calculates the lower threshold value $TCT_{LM}$ and the upper threshold value $TCT_{HM}$ by multiplying two predetermined proportionality constants $TCR_{LM}$ and $TCR_{HM}$ by the average brightness C of the central 3×3 pixel area PVV, respectively.

The comparing/classifying unit 16 compares a brightness change average value corresponding to a mean of the 8 brightness variations H1, H2, V1, V2, S1, S2, B1, and B2 with the lower threshold value $TCT_{LM}$ and the upper threshold value $TCT_{HM}$ and classifies a brightness change level of the pixel of interest y33 into three levels, thereby outputting a brightness change level signal S.

The brightness change average value calculated by the comparing/classifying unit 16 is expressed in Equation 9:

$$EMV = \frac{H1 + H2 + V1 + V2 + S1 + S2 + B1 + B2}{8} \quad (9)$$

wherein EMV indicates the brightness change average value.

The comparing/classifying unit 16 compares the brightness change average value EMV with the lower threshold value $TCT_{LM}$ and the upper threshold value $TCT_{HM}$ so as to output the brightness change level signal S having three stages of brightness change levels as described below.

First, when the brightness change average value EMV is less than or equal to the lower threshold value $TCT_{LM}$, the comparing/classifying unit 16 classifies the brightness change level of the pixel of interest into a first level.

Second, when the brightness change average value EMV is equal to or more than the upper threshold value $TCT_{HM}$, the comparing/classifying unit 16 classifies the brightness change level of the pixel of interest into a third level.

Third, when the brightness change average value EMV is more than the lower threshold value $TCT_{LM}$ and less than the upper threshold value $TCT_{HM}$, the comparing/classifying unit 16 classifies the brightness change level of the pixel of interest into an intermediate second level.

Referring back to FIG. 1, the dynamic weight calculating unit 2 calculates different dynamic weights according to the brightness change level of the pixel of interest.

Figure 7:
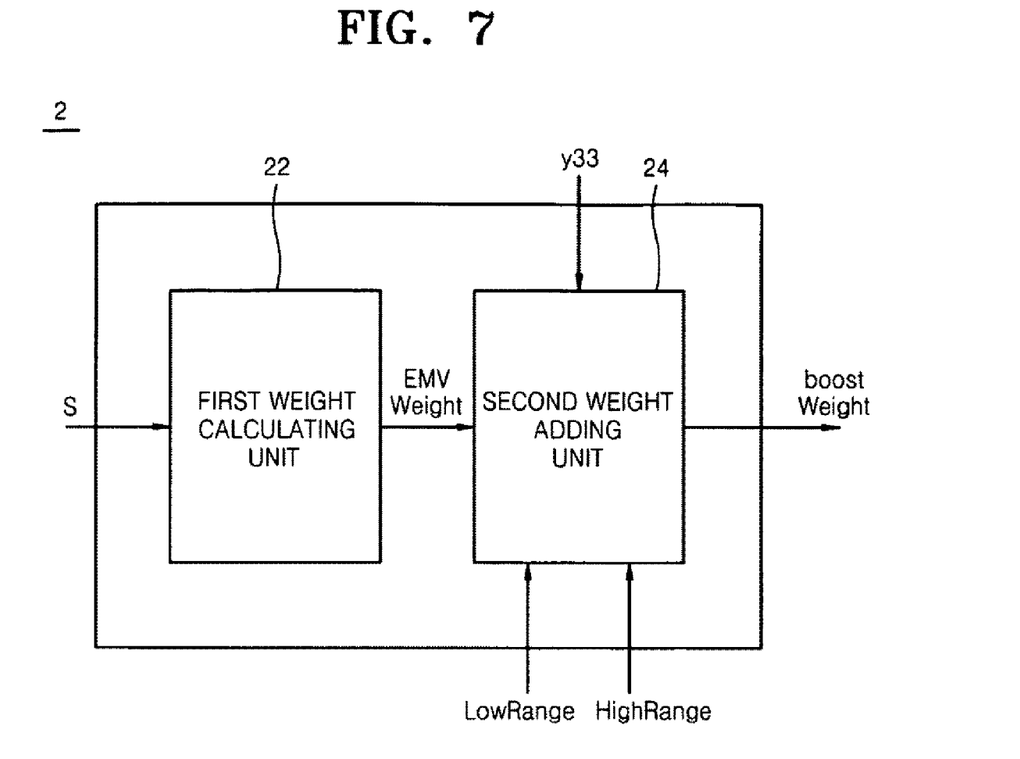
FIG. 7 is a block diagram of a dynamic weight calculating unit illustrated in FIG. 1.

The dynamic weight calculating unit 2 may be configured as illustrated in FIG. 7.

FIG. 7 is a block diagram of the dynamic weight calculating unit 2 of FIG. 1. Referring to FIG. 7, the dynamic weight calculating unit 2 includes a first weight calculating unit 22 and a second weight adding unit 24.

The first weight calculating unit 22 calculates a first weight, based on the brightness change level of the pixel of interest.

The operation of the first weight calculating unit 22 will now be described in greater detail with reference to FIG. 8.

Figure 8:
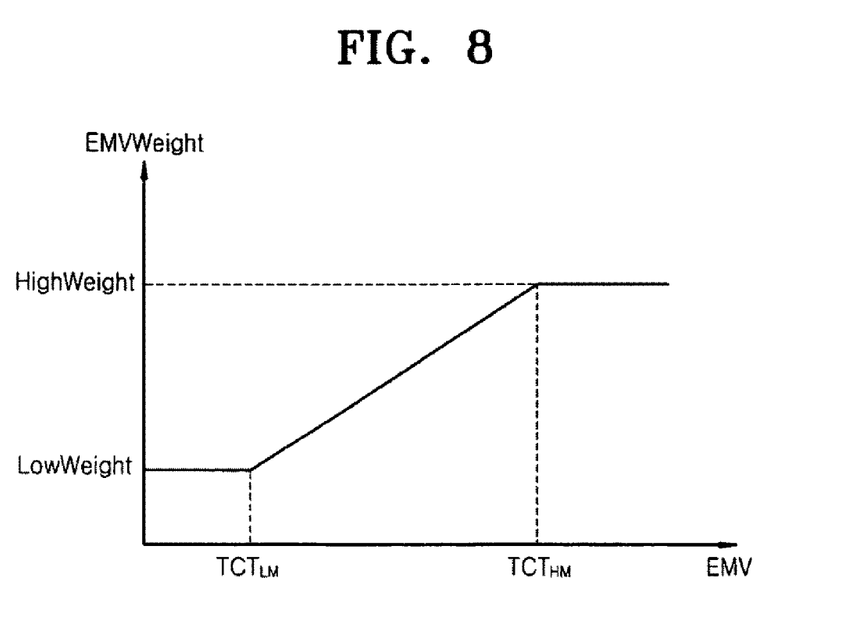
FIG. 8 is a graph for illustrating an operation of a first weight calculating unit illustrated in FIG. 7.

FIG. 8 is a graph for illustrating an operation of the first weight calculating unit 22. Referring to FIG. 8, when the brightness change level of the pixel of interest is classified into the first level, the first weight calculating unit 22 calculates and outputs a low-level first weight LowWeight. When the brightness change level of the pixel of interest is classified into the third level, the first weight calculating unit 22 calculates and outputs a high-level first weight HighWeight. When the brightness change level of the pixel of interest is classified into the intermediate second level, the first weight calculating unit 22 calculates and outputs an intermediate-level first weight having an intermediate level in between the low-level first weight LowWeight and the high-level first weight HighWeight. The intermediate-level first weight may be a value that linearly increases from the low-level first weight LowWeight to the high-level first weight HighWeight.

Referring back to FIG. 7, the second weight adding unit 24 calculates a second weight, based on the brightness of the pixel of interest, and adds the second weight to the first weight, thereby outputting a dynamic weight boostWeight.

The operation of the second weight adding unit 24 will now be described in greater detail with reference to FIG. 9.

Figure 9:
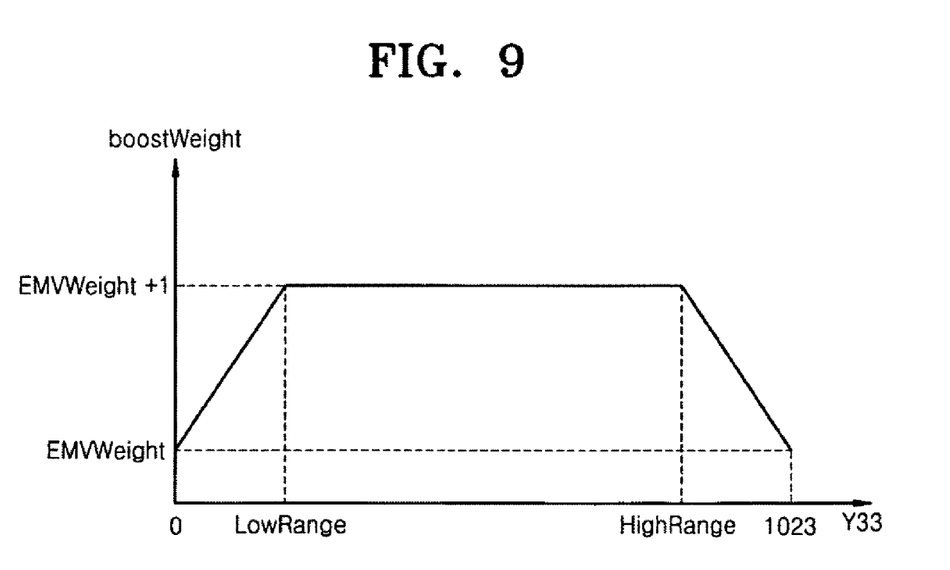
FIG. 9 is a graph for illustrating an operation of a second weight adding unit illustrated in FIG. 7.

FIG. 9 is a graph for illustrating an operation of the second weight adding unit 24 of FIG. 7. Referring to FIG. 9, when the brightness Y33 of the pixel of interest y33 is more than 20% and less than 80% of a maximum gray scale (for example, 1023), the second weight adding unit 24 adds a second weight having a value of 1 to the first weight. When the brightness Y33 of the pixel of interest y33 is less than or equal to 20% of the maximum gray scale, the second weight adding unit 24 adds a second weight which is proportional to the brightness of the pixel of interest and has a value of 1 or less, to the first weight. When the brightness Y33 of the pixel of interest y33 is equal to or more than 80% of the maximum gray scale, the second weight adding unit 24 adds a second weight which is inversely proportional to the brightness of the pixel of interest and has a value of 1 or less, to the first weight. As described above, by adding the second weight having a value of 1 or less to the first weight when the brightness of the pixel of interest is too high or too low, an edge part of an image can be emphasized and also, unnecessary noise can be efficiently reduced.

EMVWeight in FIG. 9 indicates the first weight described above with reference to FIG. 8.

Referring back to FIG. 1, the brightness correcting unit 3 corrects the brightness of the pixel of interest, based on the dynamic weight.

Figure 10:
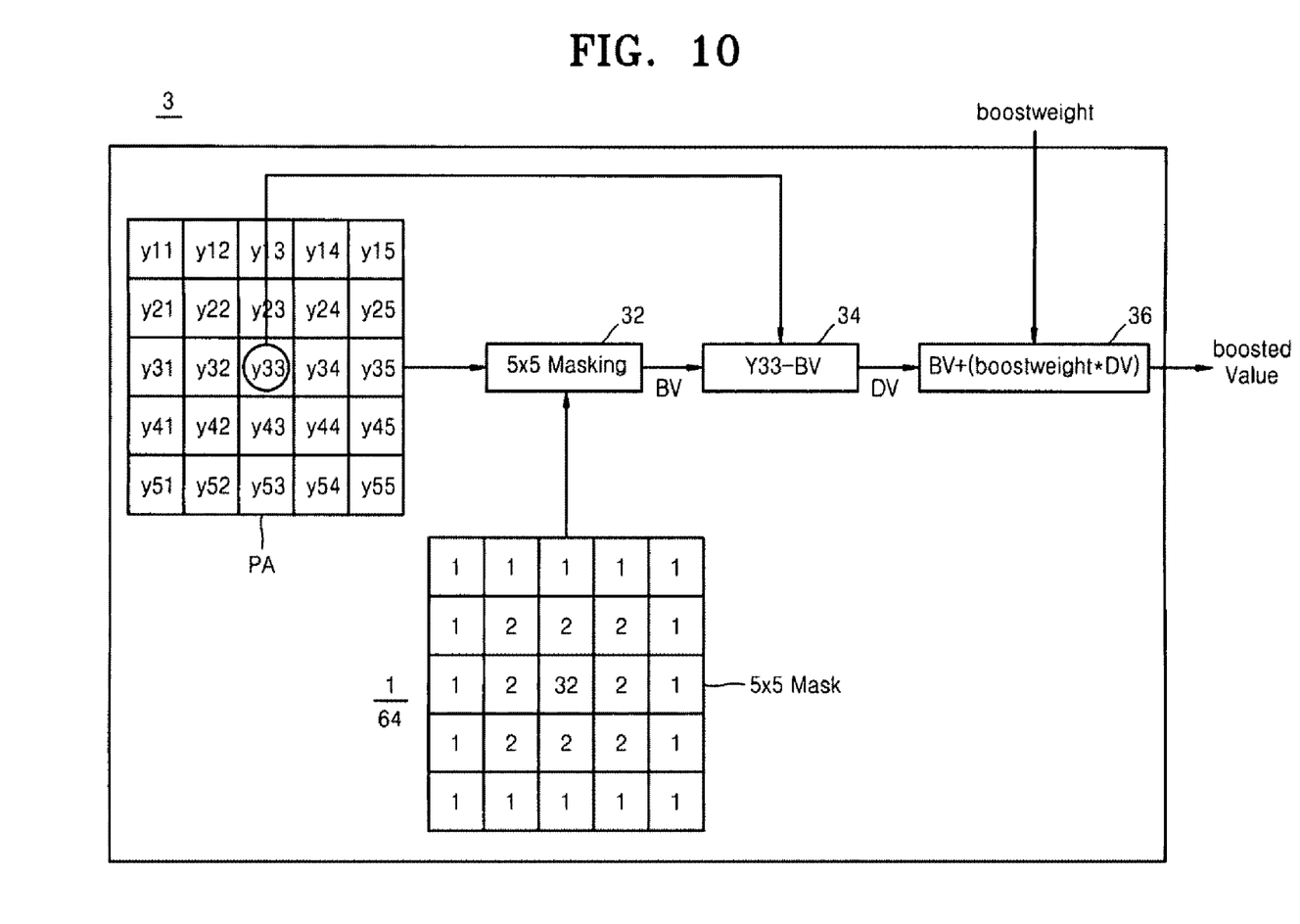
FIG. 10 is a block diagram of a brightness correcting unit illustrated in FIG. 1.

The brightness correcting unit 3 may be configured as illustrated in FIG. 10.

FIG. 10 is a block diagram of the brightness correcting unit 3 of FIG. 1. Referring to FIG. 10, the brightness correcting unit 3 includes a brightness difference calculating unit 34 and a corrected brightness calculating unit 36.

The brightness difference calculating unit 34 subtracts the average brightness of the 5×5 pixel area PA from the brightness Y33 of the pixel of interest y33 so as to calculate a brightness difference. The average brightness of the 5×5 pixel area PA is obtained by applying a 5×5 mask, in which a weight increases as going toward the center of the mask, to the 5×5 pixel area PA. Although the 5×5 mask having a weight is illustrated in FIG. 10, the present invention is not limited thereto. The brightness difference is calculated using Equation 10:

$$DV = Y33 - BV \quad (10)$$

wherein DV indicates the brightness difference, Y33 indicates the brightness of the pixel of interest, and BV indicates the average brightness of the 5×5 pixel area obtained by applying the 5×5 mask to the 5×5 pixel area.

Reference numeral 32 indicates a 5×5 pixel area average brightness calculating unit for calculating the average brightness BV of the 5×5 pixel area PA by applying the 5×5 mask, in which a weight increases the closer to the center of the 5×5 pixel area PA, to the 5×5 pixel area PA.

The corrected brightness calculating unit 36 multiplies the brightness difference DV output by the brightness difference calculating unit 34 by the dynamic weight boostweight output by the dynamic weight calculating unit 2 of FIG. 1, and adds the average brightness BV of the 5×5 pixel area PA to the result of the multiplication, thereby calculating a corrected brightness Boosted Value. This operation is expressed in Equation 11:

$$\text{Boosted Value} = BV + (\text{boostWeight} \times DV) \quad (11)$$

wherein BoostedValue indicates the corrected brightness and boostweight indicates the dynamic weight.

Thereafter, the brightness Y33 of the pixel of interest y33 is replaced by the corrected brightness Boosted Value, so that the edge part of the image can be emphasized to a degree suitable for the brightness variation.

Figure 11:
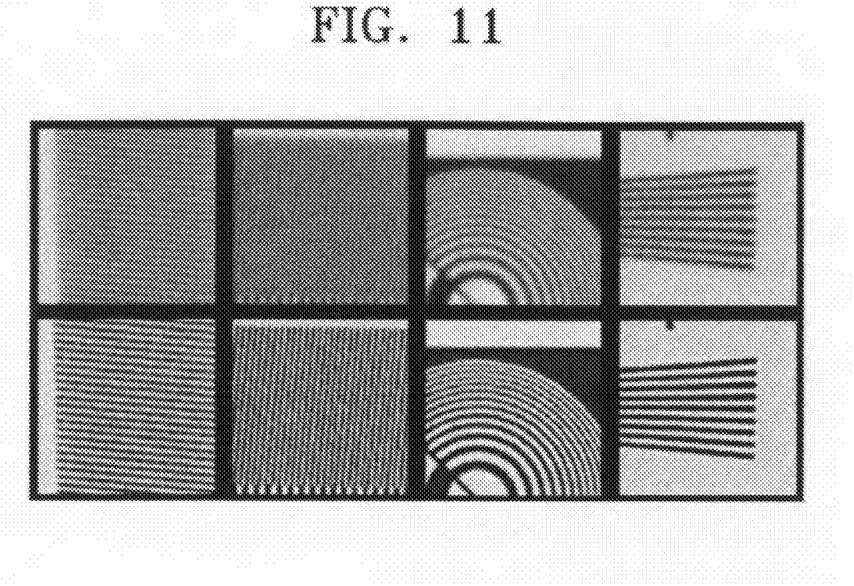
FIGS. 11 through 13 illustrate results of an image processing experiment performed by the image processing apparatus illustrated in FIG. 1.
Figure 12:
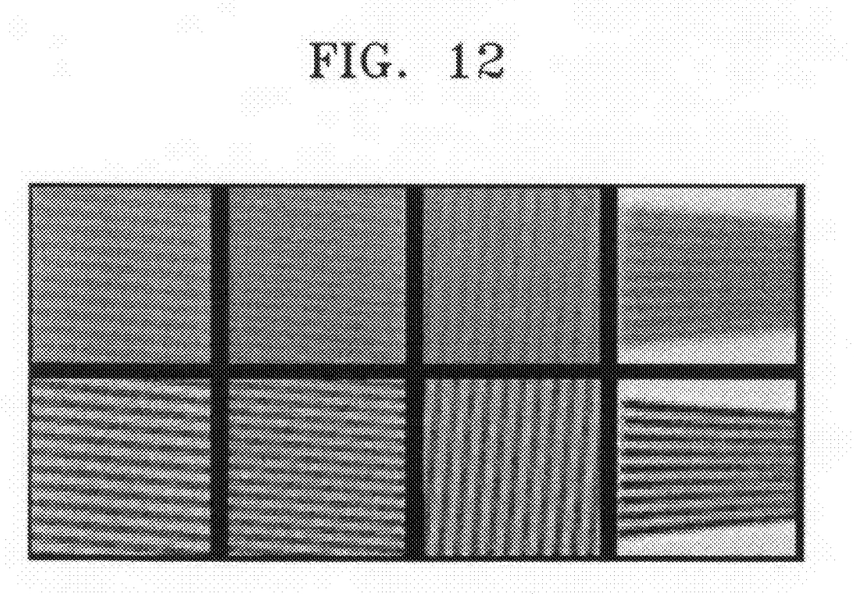
Figure 13:
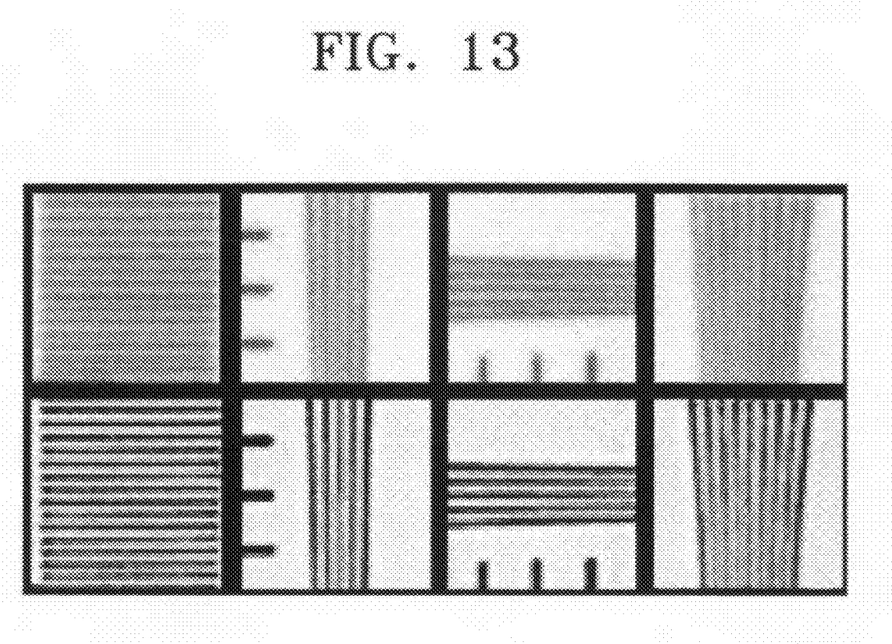

As described above, according to the image processing apparatus according to the above-described embodiment, noise generated on a plane part of the image is minimized and the contour of the image is appropriately emphasized, consequently improving the definition of images. Results of image processing performed by the image processing apparatus according to the above-described embodiment are illustrated in FIGS. 11 through 13.

The operating principle of an image processing method according to an embodiment of the present invention is substantially the same as the above-described operation of the image processing apparatus according to the above-described embodiment. Thus, a detailed description of the image processing method according to the current embodiment will be omitted and may be understood by those of ordinary skill in the art, based on the detailed description of the image processing apparatus according to the above-described embodiment.

As described above, in an image processing apparatus and an image processing method according to the present invention, noise generated on a plane part of an image is minimized and a contour of the image is appropriately emphasized, consequently improving the definition of images.

Moreover, detailed information included in an image is inspected, and the image is then processed considering the detailed information, consequently efficiently improving the quality of output images.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image processing apparatus comprising:
a brightness change level classifying unit for comparing a brightness change average value representing brightness changes from a pixel of interest to neighboring pixels around the pixel of interest with an upper threshold value and a lower threshold value, and classifying a brightness change level of the pixel of interest into three types of levels according to a result of the comparison, wherein the upper threshold value and the lower threshold value are predetermined based on a brightness of the pixel of interest,
a dynamic weight calculating unit for calculating different dynamic weights according to the brightness change level of the pixel of interest, wherein the different dynamic weights further comprise one weight based on the brightness change level of the pixel of interest and another weight added to the one weight based on the brightness of the pixel of interest, and
a brightness correcting unit for correcting the brightness of the pixel of interest, based on the dynamic weights.

2. The image processing apparatus of claim 1, wherein the brightness change level classifying unit comprises:
a brightness variation calculating unit for calculating 8 brightness variations of 8 3×3 pixel areas surrounding, in 8 directions, a central 3×3 pixel area that includes a pixel of interest as a center pixel, wherein all the 3×3 pixel areas are within a 5×5 pixel area; and
a comparing/classifying unit for comparing a brightness change average value corresponding to a mean of the 8 brightness variations with the lower threshold value and the upper threshold value, and classifying a brightness change level of the pixel of interest into three types of levels.

3. The image processing apparatus of claim 2, wherein predetermined weights are applied to center pixels of the 8 3×3 pixel areas and the central 3×3 pixel area.

4. The image processing apparatus of claim 2, wherein:
when the brightness change average value is less than or equal to the lower threshold value, the comparing/classifying unit classifies the brightness change level of the pixel of interest into a first level;
when the brightness change average value is more than the lower threshold value and less than the upper threshold value, the comparing/classifying unit classifies the brightness change level of the pixel of interest into a second level; and
when the brightness change average value is equal to or more than the upper threshold value, the comparing/classifying unit classifies the brightness change level of the pixel of interest into a third level.

5. The image processing apparatus of claim 4, wherein the upper and lower threshold values are obtained by multiplying two different proportionality constants by an average brightness of the central 3×3 pixel area.

6. The image processing apparatus of claim 1, wherein the dynamic weight calculating unit comprises:
a first weight calculating unit for calculating a first weight, based on the brightness change level of the pixel of interest; and
a second weight adding unit for adding a second weight to the first weight, based on the brightness of the pixel of interest.

7. The image processing apparatus of claim 6, wherein:
when the brightness change level of the pixel of interest is classified into the first level, the first weight calculating unit calculates a low-level first weight;
when the brightness change level of the pixel of interest is classified into the third level, the first weight calculating unit calculates a high-level first weight; and
when the brightness change level of the pixel of interest is classified into the second level, the first weight calculating unit calculates an intermediate-level first weight that gradually increases from the low-level first weight to the high-level first weight.

8. The image processing apparatus of claim 7, wherein the intermediate-level first weight linearly increases from the low-level first weight to the high-level first weight.

9. The image processing apparatus of claim 7, wherein:
when the brightness of the pixel of interest is more than 20% and less than 80% of a maximum gray scale, the second weight adding unit adds a second weight having a value of 1 to the first weight;
when the brightness of the pixel of interest is less than or equal to 20% of the maximum gray scale, the second weight adding unit adds a second weight which is proportional to the brightness of the pixel of interest and has a value of 1 or less, to the first weight; and
when the brightness of the pixel of interest is equal to or more than 80% of the maximum gray scale, the second weight adding unit adds a second weight which is inversely proportional to the brightness of the pixel of interest and has a value of 1 or less, to the first weight.

10. The image processing apparatus of claim 2, wherein the brightness correcting unit comprises:
a brightness difference calculating unit for calculating a brightness difference by subtracting an average brightness from the brightness of the pixel of interest, wherein the average brightness is obtained by applying, to the 5×5 pixel area, a mask having weights increasing toward the center of the 5×5 pixel area; and a corrected brightness calculating unit for calculating a corrected brightness by adding the average brightness to a value obtained by multiplying the brightness difference from the brightness difference calculating unit and the dynamic weight from the dynamic weight calculating unit.

11. An image processing method comprising:

comparing, by a brightness chancel level classifying operation, a brightness change average value representing brightness changes from a pixel of interest to neighboring pixels around the pixel of interest with an upper threshold value and a lower threshold value, and classifying by the brightness chancel level classifying operation, the brightness change level of the pixel of interest into three types of levels according to a result of the comparison, wherein the upper threshold value and the lower threshold value are predetermined based on a brightness of the pixel of interest;

calculating, by a dynamic weight calculating operation, different dynamic weights according to the brightness change level of the pixel of interest, wherein the different dynamic weights further comprise one weight based on the brightness change level of the pixel of interest and another weight added to the one weight based on the brightness of the pixel of interest; and correcting, by a brightness correcting operation, the brightness of the pixel of interest, based on the dynamic weights.

12. The image processing method of claim 11, wherein the brightness change level classifying operation comprises:

a brightness variation calculating sub-operation of calculating 8 brightness variations of 8 3×3 pixel areas surrounding, in 8 directions, a central 3×3 pixel area that includes a pixel of interest as a center pixel, wherein all the 3×3 pixel areas are within a 5×5 pixel area; and a comparing/classifying operation that includes comparing a brightness change average value corresponding to a mean of the 8 brightness variations with the lower threshold value and the upper threshold value, and classifying a brightness change level of the pixel of interest into three types of levels.

13. The image processing method of claim 12, wherein predetermined weights are applied to center pixels of the 8 3×3 pixel areas and the central 3×3 pixel area.

14. The image processing method of claim 12, wherein:

when the brightness change average value is less than or equal to the lower threshold value, the brightness change level of the pixel of interest is classified into a first level;

when the brightness change average value is more than the lower threshold value and less than the upper threshold value, the brightness change level of the pixel of interest is classified into a second level; and when the brightness change average value is equal to or more than the upper threshold value, the brightness change level of the pixel of interest is classified into a third level.

15. The image processing method of claim 14, wherein the upper and lower threshold values are obtained by multiplying two different proportionality constants by an average brightness of the central 3×3 pixel area.

16. The image processing method of claim 11, wherein the dynamic weight calculating operation comprises:

a first weight calculating sub-operation of calculating a first weight, based on the brightness change level of the pixel of interest; and a second weight adding sub-operation of adding a second weight to the first weight, based on the brightness of the pixel of interest.

17. The image processing method of claim 16, wherein:

when the brightness change level of the pixel of interest is classified into the first level, a low-level first weight is calculated;

when the brightness change level of the pixel of interest is classified into the third level, a high-level first weight is calculated; and when the brightness change level of the pixel of interest is classified into the second level, an intermediate-level first weight that gradually increases from the low-level first weight to the high-level first weight is calculated.

18. The image processing method of claim 17, wherein the intermediate-level first weight linearly increases from the low-level first weight to the high-level first weight.

19. The image processing method of claim 16, wherein:

when the brightness of the pixel of interest is more than 20% and less than 80% of a maximum gray scale, a second weight having a value of 1 is added to the first weight;

when the brightness of the pixel of interest is less than or equal to 20% of the maximum gray scale, a second weight which is proportional to the brightness of the pixel of interest and has a value of 1 or less, is added to the first weight; and when the brightness of the pixel of interest is equal to or more than 80% of the maximum gray scale, a second weight which is inversely proportional to the brightness of the pixel of interest and has a value of 1 or less, is added to the first weight.

20. The image processing method of claim 11, wherein the brightness correcting operation comprises:

a brightness difference calculating sub-operation of calculating a brightness difference by subtracting an average brightness from the brightness of the pixel of interest, wherein the average brightness is obtained by applying, to the 5×5 pixel area, a mask having weights increasing toward the center of the 5×5 pixel area; and a corrected brightness calculating sub-operation of calculating a corrected brightness by adding the average brightness to a value obtained by multiplying the brightness difference from the brightness difference calculating sub-operation and the dynamic weight from the dynamic weight calculating operation.

* * * * *